United States Patent
Zhao et al.

(10) Patent No.: US 9,705,438 B2
(45) Date of Patent: Jul. 11, 2017

(54) CONTROLLER FOR A FREE-RUNNING MOTOR

(71) Applicant: Infineon Technologies Austria AG, Villach (AT)

(72) Inventors: Tao Zhao, Singapore (SG); Arno Rabenstein, Munich (DE); Choon Keat Kok, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 14/799,415

(22) Filed: Jul. 14, 2015

(65) Prior Publication Data
US 2017/0019043 A1    Jan. 19, 2017

(51) Int. Cl.
*H02P 6/08*    (2016.01)
*H02P 6/182*   (2016.01)
(Continued)

(52) U.S. Cl.
CPC .............. *H02P 6/182* (2013.01); *H02P 6/003* (2013.01); *H02P 6/08* (2013.01); *H02P 6/205* (2013.01); *H02P 6/22* (2013.01); *H02P 6/24* (2013.01)

(58) Field of Classification Search
CPC .... H02P 6/182; H02P 6/08; H02P 6/24; H02P 6/22
See application file for complete search history.

(56) References Cited

U.S. PATENT DOCUMENTS

| 4,423,367 A | 12/1983 | Blaschke et al. |
| 5,019,756 A | 5/1991 | Schwarz |

(Continued)

FOREIGN PATENT DOCUMENTS

| DE | 3034275 A1 | 4/1982 |
| DE | 3212439 A1 | 10/1983 |

(Continued)

OTHER PUBLICATIONS

Iura et al., "An Estimation Method of Rotational Direction and Speed for Free-Running AC Machines Without Speed and Voltage Sensor," IEEE Transactions on Industry Applications, vol. 47, No. 1, Jan./Feb. 2011, pp. 153-160.

(Continued)

*Primary Examiner* — Shawki S Ismail
*Assistant Examiner* — Muhammad S Islam
(74) *Attorney, Agent, or Firm* — Shumaker & Sieffert, P.A.

(57) ABSTRACT

A controller for controlling a multi-phase motor is described. The controller may be configured to measure a plurality of phase voltages of the multi-phase motor when the multi-phase motor is in an uncontrolled state. The controller may be configured to determine, based on the plurality of measured phase voltages, a position and a velocity of a rotor of the multi-phase motor. The velocity of the rotor includes a speed of the rotor and a direction of the rotor. The controller may be further configured to, responsive to determining that the direction of the rotor is a forward direction and the speed of the rotor satisfies a closed-loop threshold speed: set, based on the position of the rotor and the velocity of the rotor, at least one initial control condition of the rotor, and control, using closed-loop control and based on the at least one initial control condition, the rotor.

20 Claims, 9 Drawing Sheets

(51) Int. Cl.
*H02P 6/00* (2016.01)
*H02P 6/20* (2016.01)
*H02P 6/22* (2006.01)
*H02P 6/24* (2006.01)

(56) References Cited

U.S. PATENT DOCUMENTS

| | | | |
|---|---|---|---|
| 5,099,182 A | 3/1992 | Isaacson et al. | |
| 5,952,810 A | 9/1999 | Yamada et al. | |
| 7,242,175 B2 | 7/2007 | Shao et al. | |
| 7,342,378 B2* | 3/2008 | Sakamoto | H02P 25/03 318/700 |
| 7,652,441 B2 | 1/2010 | Ying Yin Ho | |
| 7,667,419 B2* | 2/2010 | Fukamizu | H02P 6/182 318/400.01 |
| 8,138,697 B2 | 3/2012 | Palma | |
| 8,432,112 B2 | 4/2013 | Henderson et al. | |
| 2008/0048598 A1* | 2/2008 | Shibuya | H02P 6/185 318/400.1 |
| 2011/0022276 A1* | 1/2011 | Thaduvayi | B60K 6/46 701/48 |
| 2012/0116581 A1* | 5/2012 | Kwon | G05B 19/4067 700/245 |
| 2012/0217920 A1* | 8/2012 | Singh | G01R 31/42 318/490 |
| 2014/0233262 A1 | 8/2014 | Zhao et al. | |
| 2014/0233289 A1 | 8/2014 | Zhao et al. | |
| 2014/0333241 A1 | 11/2014 | Zhao et al. | |

FOREIGN PATENT DOCUMENTS

| | | |
|---|---|---|
| DE | 4009258 A1 | 10/1990 |
| DE | 102012221172 A1 | 5/2014 |
| DE | 102013014480 A1 | 3/2015 |
| DE | 102013014481 A1 | 3/2015 |
| EP | 1758239 A2 | 2/2007 |
| EP | 1998435 A2 | 12/2008 |
| EP | 2273665 A2 | 1/2011 |
| EP | 2538545 A2 | 12/2012 |
| JP | 2009055681 A | 3/2009 |
| JP | 4406552 B2 | 1/2010 |
| JP | 5193421 B2 | 5/2013 |
| WO | 03043172 A1 | 5/2003 |
| WO | 2011145334 A1 | 11/2011 |
| WO | 2012133887 A1 | 10/2012 |

OTHER PUBLICATIONS

U.S. Appl. No. 14/274,664, by Infineon Technologies.
"XC2000 Family, AP16180, XC2000 Sensorless Fieldoriented Control," Microcontrollers, Infineon, Application Note V 1.0, Sep. 2010, 43 pp.
"EiceDRIVER™, High voltage gate drive IC, 6ED family—2nd generation, Technical description," Infineon, Application Note, AN-EICEDRIVER-6EDL04-1, Rev. 1.3, Mar. 23, 2014, 23 pp.
Office Action from counterpart German Application No. 1020161128724, dated Aug. 8, 2016, 6 pp.

* cited by examiner

CONTROLLER FOR A FREE-RUNNING MOTOR

TECHNICAL FIELD

This disclosure relates to multi-phase machines, and more particular, to techniques and circuits associated with multi-phase machines.

BACKGROUND

Operation of multi-phase motors requires a dedicated controller. Occasionally, a motor may be running in a free-running state such that the motor is not controlled by the controller. The controller may attempt to regain control of the motor. However, over-current faults, over-voltage faults, startup jerks, or startup fails can occur if the inverter voltages do not match the rotor position and rotor velocity of a free-running motor.

SUMMARY

The disclosure describes techniques and systems for improving operation of a multi-phase machine.

In some examples, the disclosure is directed to a controller for controlling a multi-phase motor. The controller may be configured to measure a plurality of phase voltages of the multi-phase motor when the multi-phase motor is in an uncontrolled state. The controller may also be configured to determine, based on the plurality of measured phase voltages, a position of a rotor of the multi-phase motor. The further may further be configured to determine, based on the plurality of measured phase voltages, a velocity of the rotor, wherein the velocity of the rotor includes a speed of the rotor and a direction of the rotor. The controller may be configured to, responsive to determining that the direction of the rotor is a forward direction and the speed of the rotor satisfies a closed-loop threshold speed: set, based on the position of the rotor and the velocity of the rotor, at least one initial control condition of the rotor; and control, using closed-loop control and based on the at least one initial control condition, the rotor.

In some examples, the disclosure is directed to a method of controlling a multi-phase machine. The method may include measuring a plurality of phase voltages of a multi-phase motor when the multi-phase motor is in an uncontrolled state. The method may also include determining, based on the plurality of measured phase voltages, a position of a rotor of the multi-phase motor. The method may further include determining, based on the plurality of measured phase voltages, a velocity of the rotor, wherein the velocity of the rotor includes a speed of the rotor and a direction of the rotor. The method may include, responsive to determining that the direction of the rotor is a forward direction and the speed of the rotor satisfies a closed-loop threshold speed: setting, based on the position of the rotor and the velocity of the rotor, at least one initial control condition of the rotor; and controlling, using closed-loop control and based on the at least one initial control condition, the rotor.

In some examples, the disclosure is directed to a system including a multi-phase machine and a controller for controlling the multi-phase machine. The controller may be configured to measure a plurality of phase voltages of the multi-phase motor when the multi-phase motor is in an uncontrolled state. The controller may also be configured to determine, based on the plurality of measured phase voltages, a position of a rotor of the multi-phase motor. The further may further be configured to determine, based on the plurality of measured phase voltages, a velocity of the rotor, wherein the velocity of the rotor includes a speed of the rotor and a direction of the rotor. The controller may be configured to, responsive to determining that the direction of the rotor is a forward direction and the speed of the rotor satisfies a closed-loop threshold speed: set, based on the position of the rotor and the velocity of the rotor, at least one initial control condition of the rotor; and control, using closed-loop control and based on the at least one initial control condition, the rotor.

In some examples, the disclosure is directed to a controller for controlling a multi-phase motor. The controller may be configured to measure a phase voltage of the multi-phase motor with an ADC when the multi-phase motor is in an uncontrolled state. The controller may also be configured to determine, based on the phase voltage, a speed of a rotor of the multi-phase motor. The controller may further be configured to, responsive to determining that the speed of the rotor does not satisfy a closed-loop threshold speed: brake the rotor until the rotor has stopped rotating; re-start the rotor in the forward direction; control, using open-loop control and while the speed of the rotor does not satisfy the closed-loop threshold speed, the rotor; and control, using closed-loop control and while the speed of the rotor satisfies the closed-loop threshold speed, the rotor.

The details of one or more examples are set forth in the accompanying drawings and the description below. Other features, objects, and advantages of the disclosure will be apparent from the description and drawings, and from the claims.

DETAILED DESCRIPTION

In general, this disclosure is directed to techniques of controlling a multi-phase machine. The multi-phase machine includes a multi-phase motor and a controller for controlling the multi-phase motor. The rotor of the multi-phase motor may spin freely in an uncontrolled state (also called a free-running state). Examples of free-running motors may exist in almost any electric motor application, such as motors that include a rotor that remains spinning when a controller loses power. The controller may attempt to gain control of the rotor while it is spinning in an uncontrolled, free-running state. In some examples, the controller gains control of a multi-phase motor that is running in free-running state by measuring a plurality of voltages created by the rotation of the free-running multi-phase motor. The controller determines the back electromotive force (BEMF) space vector of the rotor, the rotor velocity (including rotor speed and direction), and the rotor position. By determining the BEMF space vector, rotor velocity, and rotor position, the controller may set the initial control conditions (e.g., inverter output voltage, a plurality of motor phase currents, a plurality of quadrature voltages [$V_d$ and $V_q$], and any other conditions used to control a multi-phase motor) to match the existing conditions in order to smoothly transition the rotor from an uncontrolled, free-running state to a controlled state.

The disclosure describes techniques that may improve operation of a multi-phase machine by enabling a controller to seamlessly gain (or re-gain) control of the multi-phase motor. The controller may regain control of the multi-phase motor without applying an external voltage to the multi-phase motor and without shorting the phases of the multi-phase motor. The controller may set the initial control conditions to match the existing conditions of the free-running motor. As a result, techniques described in the disclosure may lower the risk of damaging the multi-phase motor and/or the controller due to over-current faults, over-voltage faults, startup jerks, or startup fails. The controller may gain control of the multi-phase motor without relying on stator sensors or rotor sensors, which may allow control of a sensorless multi-phase motor. If the multi-phase machine includes stator or rotor sensors, the controller may provide redundant control should the sensors fail.

Figure 1:
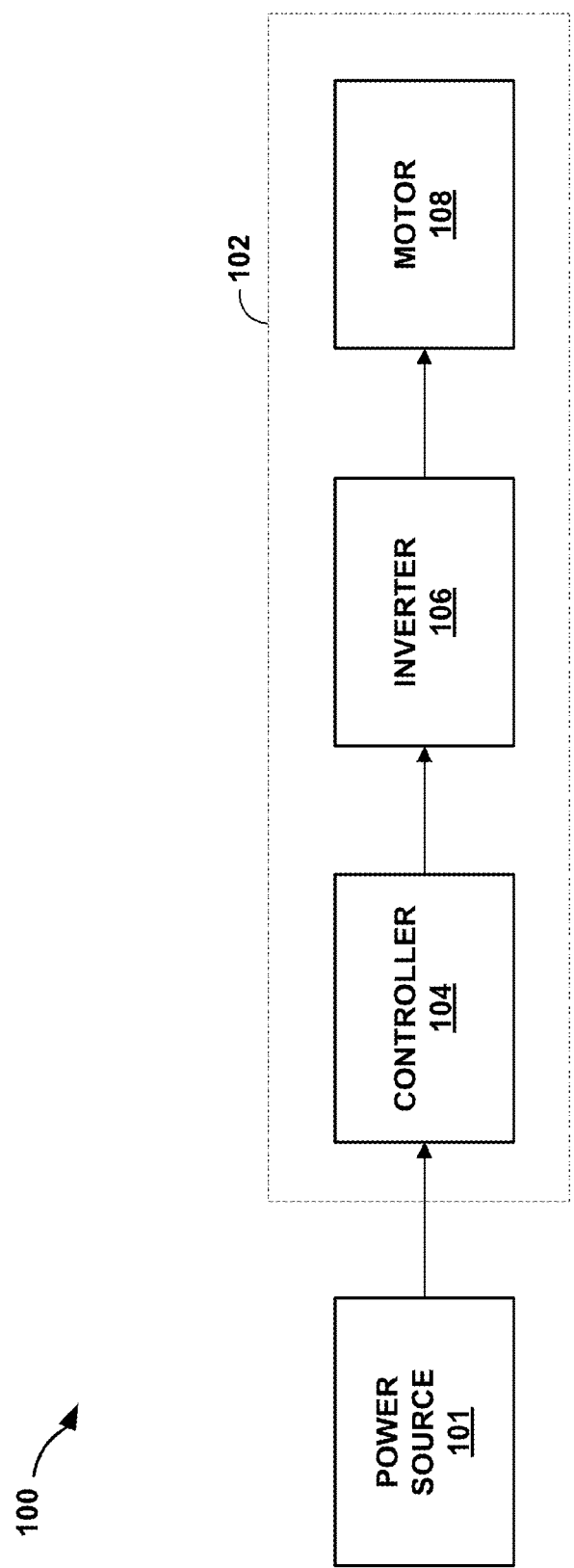
FIG. 1 is a block diagram illustrating an example system for operating a multi-phase machine, in accordance with one or more aspects of this disclosure.

FIG. 1 is a block diagram illustrating an example system 100 for operating a multi-phase machine 102, in accordance with one or more aspects of this disclosure. FIG. 1 shows system 100 as having separate and distinct components, shown as power source 101 and multi-phase machine 102, however system 100 may include additional or fewer components. For instance, power source 101, controller 104, inverter 106, and motor 108 may be four individual components or may represent a combination of one or more components that provide the functionality of system 100 as described herein.

In the example of FIG. 1, system 100 includes power source 101 which provides electrical power to motor 108. For example, when power source 101 comprises a generator or generators, transformers, batteries, solar panels, or regenerative braking systems, system 100 may include power source 101. In other examples, system 100 may be separate from power source 101. For example, when power source 101 comprises power grids, generators, transformers, external batteries, external solar panels, windmills, hydro-electrical or wind-powered generators, or any other form of devices that are capable of providing electrical power to system 100, system 100 may be separate from power source 101. As described above, numerous examples of power source 101 exist and may include, but are not limited to, power grids, generators, transformers, batteries, solar panels, windmills, regenerative braking systems, hydro-electrical or wind-powered generators, or any other form of devices that are capable of providing electrical power to system 100.

Multi-phase machine 102 may refer to any machine with three or more phases. For example, multi-phase machine 102 may include three phases, four phases, five phases, six phases, or potentially any plurality of phases. In general, multi-phase machine 102 includes N phases, where N is any positive integer greater than two. Each phase in the N-phase motor 108 is offset or shifted from the other phases, creating a rotating field. Typically, each phase is offset by $$\frac{360}{N}$$

degrees or $$\frac{2\pi}{N}$$

radians. However, me onset between the various phases may not be equal between each phase.

In the example of FIG. 1, multi-phase machine 102 includes controller 104, inverter 106, and multi-phase motor 108. In some examples, multi-phase machine 102 includes electric or hybrid vehicles. Electric or hybrid vehicles include passenger vehicles, commercial vehicles, all-terrain vehicles, watercraft, aircraft, or any other type of vehicle. However, multi-phase machine 102 is not limited to vehicles and may include any machine with a multi-phase motor 108.

Inverter 106 includes an N-phase inverter, where N is the same number of phases of the N-phase machine 102. Inverter 106 includes one or more switches (e.g., MOS transistor based switches, gallium nitride (GaN) based switches, or other types of switch devices) that are controlled by controller 104, according to one or more modulation techniques. Controller 104 includes one or more gate drivers and control logic to control (e.g., turn-on and turn-off) the one or more switches using modulation techniques. The modulation of the switches may operate according to pulse density modulation (PDM), pulse width modulation (PWM), pulse frequency modulation (PFM), or another suitable modulation technique. In PWM, the width (i.e., duration) of the pulse is modulated based on a modulator signal. In PDM, the relative density of a pulse corresponds to an analog signal's amplitude. In PFM, the frequency of a pulse train is varied based on the instantaneous amplitude of the modulating signal at sampling intervals. By controlling the switches of inverter 106 using modulation techniques, controller 104 regulates operation of multi-phase motor 108.

In some examples, multi-phase motor 108 includes a shaft, rotor, stator, and permanent magnet. Multi-phase motor 108 may include a permanent magnet synchronous motor (PMSM), brushless DC (BLDC) motor, multi-pole-pair motor, or other types of multi-phase motors. In some examples, multi-phase motor 108 includes a sensorless multi-phase motor. For example, a sensorless multi-phase motor 108 does not include sensors to monitor the stator currents, or the speed, direction, or position of the rotor.

Controller 104 controls operation of multi-phase motor 108. In some examples, controller 104 controls multi-phase motor 108 using open-loop and/or closed-loop control (e.g., field-oriented control (FOC), maximum efficiency tracking (MET), direct torque control (DTC), or other control techniques). Controller 104 determines whether multi-phase motor 108 is in a free-running state (i.e., the rotor is spinning but it is not controlled by controller 104). Controller 104 determines operational values of multi-phase motor 108, such as the BEMF vector, the rotor velocity (including rotor speed and direction), and the rotor position for multi-phase motor 108.

Controller 104 may gain control of multi-phase motor 108 by modulating the switches of inverter 106 based on the determined operational values. For example, if controller 104 determines that the rotor is rotating in the forward direction (i.e., the direction of normal operation, also referred to as the correct direction) and the rotor speed satisfies a threshold speed for closed-loop control, controller 104 may set the closed-loop initial control conditions (e.g., inverter output voltage, a plurality of motor phase currents, a plurality of quadrature voltages [$V_d$ and $V_q$], and any other conditions used to control a multi-phase motor) to match the existing conditions to smoothly transition the rotor from an uncontrolled, free-running state to a controlled state. If controller 104 determines that the rotor is rotating in the reverse direction (i.e., reverse of the direction of normal operation, also referred to as the wrong direction) and the rotor speed satisfies a threshold speed for closed-loop control, controller 104 may set the closed-loop initial control conditions to match the existing conditions and ramp down the rotor speed. If controller 104 determines that the initial speed does not satisfy a threshold speed for closed-loop control, controller 104 may brake the rotor to a stop, and restart the motor according to normal startup conditions.

The techniques described in this disclosure may enable controller 104 to determine whether multi-phase motor 108 is in a free-running state, and to gain control of a free-running multi-phase motor 108. Controller 108 may gain control of multi-phase motor 108 more quickly than other controllers. For example, if multi-phase motor 108 is free-running, the techniques described in this disclosure may enable controller 104 to smoothly gain control of multi-phase motor 108 without first stopping multi-phase motor 108. The techniques described in the disclosure may enable controller 104 to set the initial control conditions to match the existing conditions of the free-running motor. As a result, the disclosed techniques may reduce or eliminate the risk of over-current, over-voltage, startup jerks, or startup fails.

In some examples, multi-phase motor 108 includes sensors that monitor the operational values of multi-phase motor 108. Controller 104 may be configured to utilize the techniques described in this disclosure to control multi-phase motor 108 should one or more of the sensors fail. In this way, controller 104 may provide redundant methods of controlling multi-phase motor 108. The techniques described in this disclosure may allow controller 104 to control operation of multi-phase motor 108 without sensors. As a result, multi-phase machine 102 may include fewer components, which may reduce the cost of multi-phase machine 102.

Figure 2:
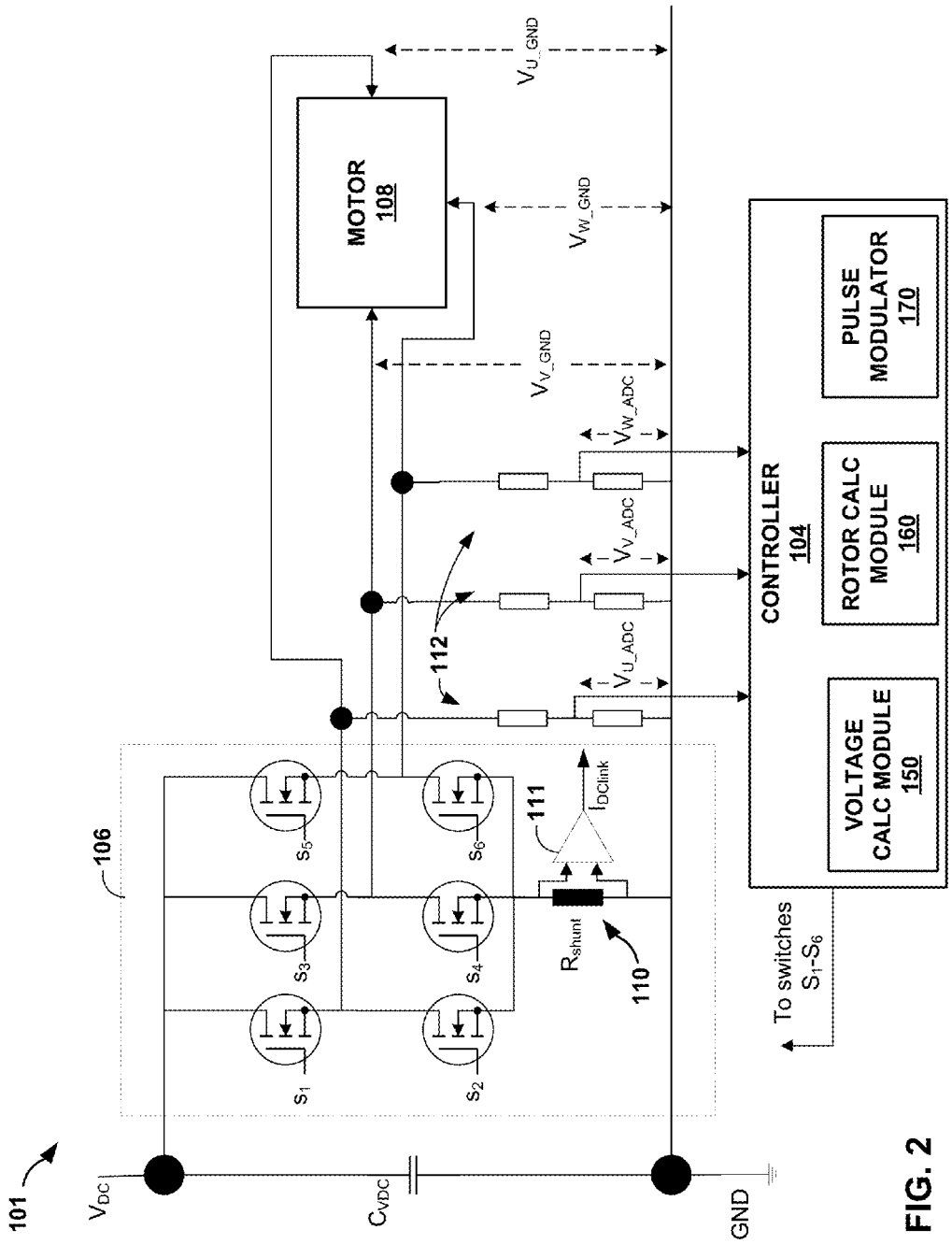
FIG. 2 is a block diagram illustrating an example multi-phase machine, in accordance with one or more aspects of this disclosure.

FIG. 2 is a block diagram illustrating an example multi-phase machine 102, in accordance with one or more aspects of this disclosure. In the example of FIG. 2, multi-phase machine 102 includes controller 104, inverter 106, and multi-phase motor 108. As further illustrated in FIG. 2, in some examples, multi-phase machine 102 includes a DC link voltage $V_{DC}$, DC link bus capacitor $C_{VDC}$, current sensing device 110, and voltage dividers 112.

For purposes of illustration only, multi-phase motor 108 includes three phases (U, V, and W). However, in general, multi-phase motor 108 may include more phases.

Inverter 106 includes switching devices to control operation of multi-phase motor 108. As shown in FIG. 2, multi-phase machine 102 includes a half-bridge for each phase of multi-phase motor 108. Each half-bridge includes a high side switch (e.g., $S_1$, $S_3$, and $S_5$) and a low side switch (e.g., $S_2$, $S_4$, and $S_6$). The switches may include MOSFET switches, IGBT switches, or similar switching devices. In some examples, as illustrated in more detail in FIG. 4, inverter 106 includes a gate driver for each switch.

Multi-phase machine 102 may include current sensing device 110. As illustrated in FIG. 2, in some examples, current sensing device 110 includes a shunt resistor $R_{shunt}$ and amplifier 111. Shunt resistor $R_{shunt}$ senses the DC link current $I_{DCLink}$ and 3-phase current reconstruction is used to obtain the information about the current for each phase of multi-phase motor 108. Amplifier 111 amplifies the resistor voltage drop, which is proportional to the DC link current $I_{DCLink}$. In some examples, current sensing device 110 includes shunt resistors inserted for each leg of inverter 106. In some examples, current sensing device 110 includes shunt resistors for some, but not all, of the legs of inverter 106. For example, where multi-phase motor 108 is a three-phase motor, current sensing device 110 may include two shunt resistors to determine the phase current of two phases. Since, the sum of the phase currents equals zero ($I_u+I_v+I_w=0$), controller 104 may calculate the third phase current based on the other two phase currents. In some examples, current sensing device 110 includes a Hall sensor, current transformer, or other current sensor.

In some examples, multi-phase machine 102 includes a voltage divider 112 for each phase of multi-phase motor 108. As shown in more detail in FIG. 3, in some examples, each voltage divider 112 includes a parasitic diode and a capacitor. Each voltage divider 112 outputs a voltage signal ($V_{U\_ADC\_U}$, $V_{V\_ADC}$ and $V_{W\_ADC}$) that is proportional to the phase voltages of multi-phase motor 108 ($V_{U\_GND}$, $V_{V\_GND}$, and $V_{W\_GND}$, respectively). Thus, controller 104 measures the voltages output by voltage dividers 112 ($V_{U\_ADC\_U}$, $V_{V\_ADC}$ and $V_{W\_ADC}$) to obtain the information about the phase voltages of multi-phase motor 108 ($V_{U\_GND}$, $V_{V\_GND}$, and $V_{W\_GND}$, respectively). While multi-phase machine 102 is shown with a voltage divider 112, multi-phase machine 102 may include any other circuitry that is appropriate to measure the motor phase voltages.

In some examples, controller 104 includes voltage calculation module 150, rotor calculation module 160, and pulse modulator 170. Voltage calculation module 150 received the voltages output by voltage dividers 112 and determines the phase voltages for one or more phases of multi-phase motor 108. Rotor calculation module 160 determines the BEMF vector of multi-phase motor 108, the rotor velocity, and rotor position based on the phase voltages calculated by voltage calculation module 150. Based on the BEMF vector, rotor velocity, and rotor direction, pulse modulator 170 modulates the duty cycles of switches $S_1$-$S_6$ of inverter 106. As a result, controller 104 may gain control of an uncontrolled, free-running multi-phase motor 108.

Figure 3:
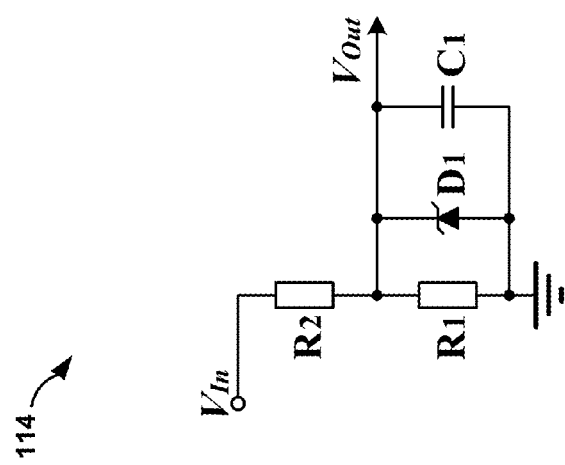
FIG. 3 is a block diagram illustrating an example voltage divider, in accordance with one or more aspects of this disclosure.

FIG. 3 is a circuit diagram illustrating an example voltage divider, in accordance with one or more aspects of this disclosure. Voltage divider 114 corresponds to voltage dividers 112 of FIG. 2. Voltage divider 114 includes resistors R1, R2. The ratio of operating bandwidth for each voltage divider 112 is given by the formula:

$$\frac{V_{Out}}{V_{In}} = \frac{R_1}{R_1 + R_2} \qquad (1)$$

In some examples, the voltage ratio of each voltage divider 114 in multi-phase machine 102 is the same. However, in some examples, the voltage ratio of at least one of the voltage dividers 114 in multi-phase machine 102 is different than the voltage ratio of another voltage diver 114 in multi-phase machine 102. In some examples, the voltage ratio of at least one of the voltage dividers 114 is variable, which may allow controller 104 to determine high-resolution ADC results for different ranges of phase voltages. Voltage divider 114 may include diode D1 and capacitor C1. Diode D1 may prevent over-voltage to the ADC input. Capacitor C1 may remove high-frequency noise.

Figure 4:
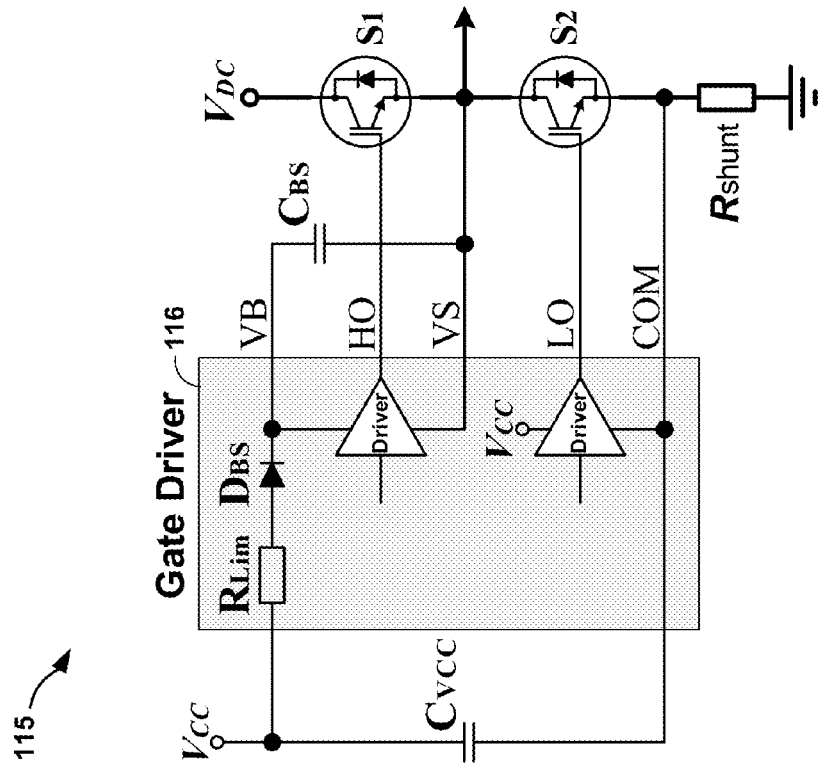
FIG. 4 is a block diagram illustrating an example gate driver, in accordance with one or more aspects of this disclosure.

FIG. 4 is a circuit diagram illustrating an example gate driver, in accordance with one or more aspects of this disclosure. In some examples, multi-phase machine 102 includes a gate driver 116 for each half-bridge (i.e., each set of high side and low side switches) of inverter 106. For example, as illustrated in FIG. 4, half-bridge 115 includes switches $S_1$, $S_2$ and bootstrap gate driver 116. Bootstrap gate driver 116 includes current limiting resistor $R_{Lim}$ and bootstrap diode $D_{BS}$. Controller 104 charges bootstrap capacitor $C_{BS}$ by turning on low-side switch $S_2$ (or $S_4$ and $S_6$ for other two half bridges of inverter 106). Once bootstrap capacitor $C_{BS}$ is charged, bootstrap capacitor $C_{BS}$ supplies a voltage greater than the $V_{CC}$ voltage to high-side switch $S_1$, causing high-side switch $S_1$ to turn on.

In some examples, controller 104 simultaneously, or nearly simultaneously, turns on each low-side switch (e.g., $S_2$, $S_4$ and $S_6$) for the respective half-bridge, to charge the respective bootstrap capacitors $C_{BS}$. However, if all of the low-side switches are on at the same time, the respective phases of multi-phase motor 108 are short circuited, which brakes multi-phase motor 108 and changes the behavior (e.g., the speed) of the rotor.

In some examples, controller 104 turns on each low-side switch for the respective half-bridge sequentially to charge each respective bootstrap capacitor $C_{BS}$. For example, once the bootstrap capacitor $C_{BS}$ for high-side switch $S_1$ is charged, low-side switch $S_2$ is turned off and low-side switch $S_4$ is turned on. Likewise, once the bootstrap capacitor $C_{BS}$ for high-side switch $S_3$ is charged, low-side switch $S_4$ is turned off and low-side switch $S_6$ is turned on. As a result, the bootstrap capacitors for phases U,V,W are turned on one by one so that the phases are not short-circuited. Because controller 104 turns on each high-side switch sequentially, there is minimal effect on the behavior on multi-phase motor 108. In addition, charging each bootstrap capacitor $C_{BS}$ sequentially reduces the current at the respective bootstrap capacitor $C_{BS}$, which may reduce the stress on the respective bootstrap capacitor $C_{BS}$ and improve longevity of the electrical circuit.

Figure 5:
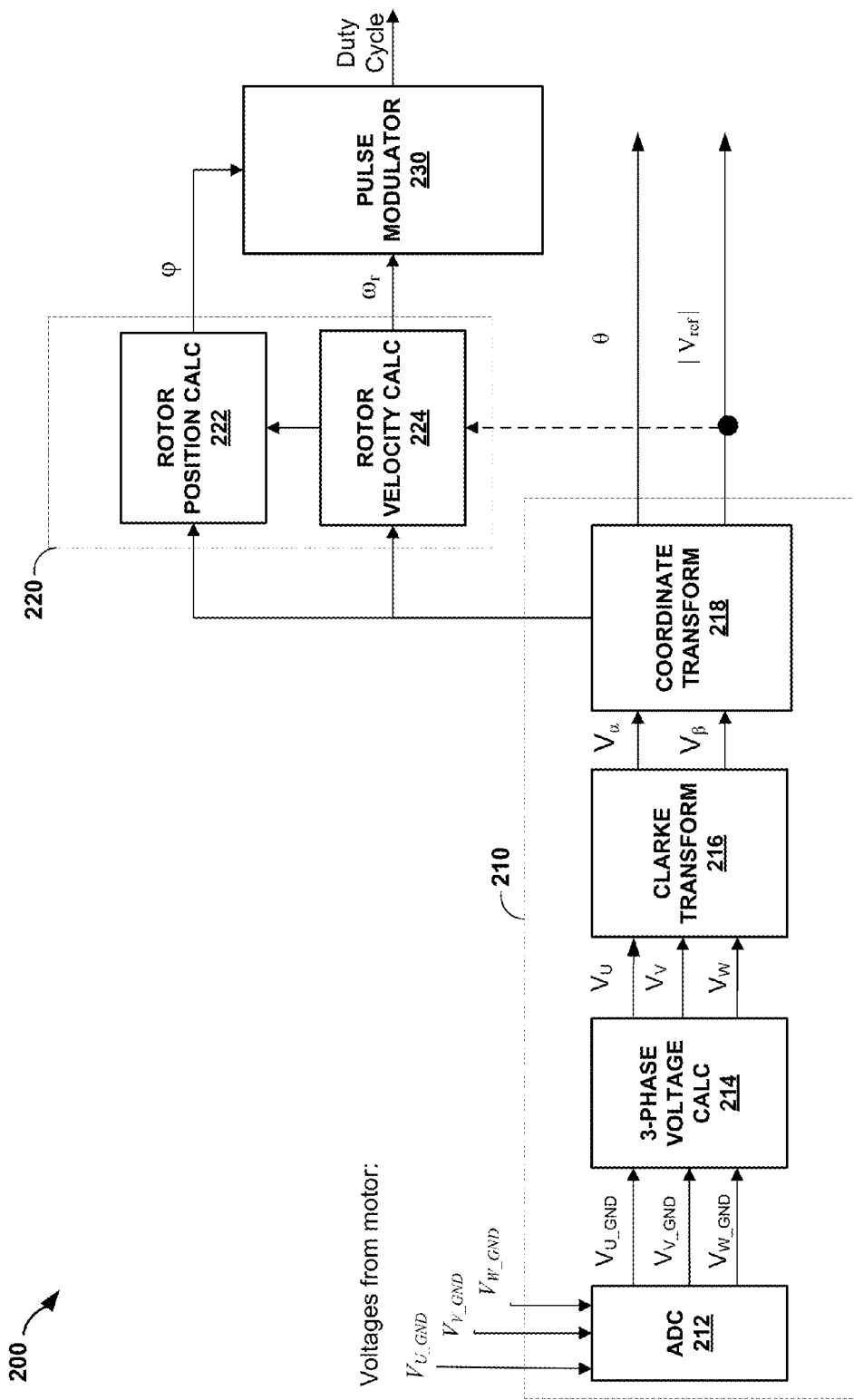
FIG. 5 is a block diagram illustrating an example controller, in accordance with one or more aspects of this disclosure.

FIG. 5 is a block diagram illustrating an example controller 200, in accordance with one or more aspects of this disclosure. In some examples, controller 200 includes voltage calculation module 210, rotor calculation module 220, and pulse modulator 230. Controller 200 controls inverter 106 via modules 210, 220, and 230. As a result, controller 200 controls multi-phase motor 108. For ease of illustration only, controller 200 is described as controlling a three-phase motor 108. However, controller 200 may control multi-phase motors with different numbers of phases.

In some examples, voltage calculation module 210 includes a plurality of ADCs 212, and a plurality of sub-modules including 3-phase voltage calculation module 214, Clarke transformation module 216, and coordinate transformation module 218.

Voltage calculation module 210 includes a plurality of inputs and outputs. In some examples, inputs to voltage calculation module 210 include motor phase voltages with respect to ground. For example, voltage calculation module 210 may receive voltages from all three phases: $V_{U\_GND}$, $V_{V\_GND}$ and $V_{W\_GND}$. However, in some examples, voltage calculation module 210 may receive a subset of the voltages from multi-phase motor 108. For example, voltage calculation module 210 may receive voltages for two of the three phases and determine the third voltage based on the two received voltages without measuring the voltage with an ADC. In some examples, voltage calculation module 210 outputs a BEMF space vector, including magnitude |Vref| and angle θ. Since the BEMF space vector may be the same as the initial stator voltage space vector, controller 104 may set the closed-loop initial control conditions of the motor and gain control of a free-running motor. The relationship between the inputs and outputs is described in more detail with respect to the respective submodules.

Voltage calculation module 210 determines the motor phase voltages for each phase of multi-phase motor 108. In some examples, voltage calculation module 210 monitors the motor phase voltage for each phase of multi-phase motor 108 with a respective ADC 212. For example, voltage calculation module 212 may include three ADCs, such that each ADC 212 receives a respective motor phase voltage ($V_{u\_GND}$, $V_{v\_GND}$ and $V_{w\_GND}$) with reference of common ground (GND). Each ADC measures the respective motor phase voltages simultaneously or at very close intervals. In some examples, optional ADC triggering can also be used for simultaneous measurement of voltages with precise timing. Each ADC 212 measures the respective motor phase voltages and outputs a digital value that represents the amplitude of the voltage for the respective motor phase $V_{u\_GND}$, $V_{v\_GND}$ and $V_{w\_GND}$.

In some examples, voltage calculation module 210 monitors the motor phase voltage for a subset of the phases of multi-phase motor phase 108 with a respective ADC. Voltage calculation module 210 determines the voltage for the non-monitored voltages based on the monitored voltages, rather than measuring the voltage with an ADC. Voltage calculation module 212 may include two ADCs, such that each ADC 212 receives a voltage for a respective phase of multi-phase motor 108. For example, voltage calculation module 210 may monitor motor phase voltages $V_{U\_GND}$ and $V_{V\_GND}$ with respective ADCs 212. The respective ADCs 212 measure the respective motor phase voltages and output a digital value that represents the amplitude of the voltage for the respective motor phase. Voltage calculation module 210 may determine the third voltage $V_{W\_GND}$ based on the first monitored voltage $V_{U\_GND}$ and the second monitored voltage $V_{V\_GND}$. For example, as further illustrated in FIG. 7, at any given point in time, two of the three phases voltages are greater than zero volts and the third phase voltage is zero or approximately zero volts. Thus, when monitored phase voltages $V_{U\_GND}$ and $V_{V\_GND}$ are known to be greater than zero volts, controller 104 may determine that $V_{W\_GND}$ is zero or approximately zero volts. In some examples, voltage calculation module 210 may monitor a different subset of motor phase voltages (e.g., $V_{V\_GND}$ and $V_{W\_GND}$, or $V_{U\_GND}$ and $V_{W\_GND}$) and calculate the non-monitored voltage ($V_{U\_GND}$ or $V_{V\_GND}$, respectively) based on the monitored voltages.

Regardless of whether voltage calculation module 210 monitors each the motor phase voltage with a respective ADC, or monitors a subset of motor phase voltages with respective ADCs and calculates the voltage for the non-monitored phases, voltage calculation module 210 determines the voltage with respect to ground for all three motor phases $V_{U\_GND}$, $V_{V\_GND}$ and $V_{W\_GND}$. The three motor phases with respect to ground are represented by the 3-phase BEMF space vector, shown as $[V_{U\_GND}, V_{V\_GND}, V_{W\_GND}]$. Voltage calculation module 210 outputs the 3-phase BEMF space vector.

3-phase voltage calculation module 214 receives the 3-phase BEMF space vector and determines the voltages of the motor stator windings with reference to the motor neutral point (also referred to as the phase-to-neutral voltages). 3-phase voltage calculation module 214 determines the phase-to-neutral voltages $V_U$, $V_V$, and $V_W$ using a 3-Phase Voltage Calculation. Each of the phase-to-neutral voltages $V_U$, $V_V$, and $V_W$ can be calculated as follows:

$$V_U = K_1 \cdot (2V_{U\_GND} - V_{V\_GND} - V_{W\_GND}) \quad (2)$$

$$V_V = K_1 \cdot (-V_{U\_GND} + 2V_{V\_GND} - V_{W\_GND}) \quad (3)$$

$$V_W = K_1 \cdot (-V_{U\_GND} - V_{V\_GND} + 2V_{W\_GND}) \quad (4)$$

where $K_1 = 1/3$. For simplicity, the scaling factor $K_1$ can be combined with other scaling factors, such that $K_1$ can be set equal to one ($K_1 = 1$) and ignored. After 3-phase voltage calculation module 214 calculates the phase-to-neutral voltages $V_U$, $V_V$, and $V_W$, voltage calculation module 214 outputs values representing the phase-to-neutral voltages $V_U$, $V_V$, and $V_W$.

Clarke transformation module 216 performs a Clarke transformation on the values representing the phase-to-neutral voltages $V_U$, $V_V$, and $V_W$ to obtain the equivalent 2-phase sinusoidal voltages $V_\alpha$ and $V_\beta$ in stationary $\alpha$-$\beta$ Cartesian coordinate system. Voltages $V_\alpha$ and $V_\beta$ may be calculated as follows:

$$V_\alpha = K_2 \cdot [2V_u - (V_v + V_w)]/3 \quad (5)$$

$$V_\beta = K_2 \cdot (V_v - V_w)/\sqrt{3} \quad (6)$$

where: $K_2 = 3/2$. For simplicity, the scaling factor $K_2$ can be combined with other scaling factors such that $K_2$ can be set equal to one ($K_2 = 1$) and ignored.

At any instant of time, adding the phase-to-neutral voltages $V_U$, $V_V$, and $V_W$ together (i.e., scalar addition of the phase-to-neutral voltages) produces zero volts, as shown by the equation:

$$V_U + V_V + V_W = 0 \quad (7)$$

As a result, equations 5 and 6 can be simplified and voltages $V_\alpha$ and $V_\beta$ can be calculated using the following equations:

$$V_\alpha = K_2 \cdot V_u \quad (8)$$

$$V_\beta = K_2 \cdot (V_u + 2V_v)/\sqrt{3} \quad (9)$$

where $K_2$ is again set equal to one for simplicity. After calculating the 2-phase voltages $V_\alpha$ and $V_\beta$, Clarke transformation module 216 outputs the values representing the 2-phase voltages $V_\alpha$ and $V_\beta$.

Coordinate transformation module 218 receives the values representing voltages $V_\alpha$ and $V_\beta$ and transforms the values representing voltages $V_\alpha$ and $V_\beta$ from stationary coordinates to the rotating BEMF vector in polar coordinates. The magnitude of the BEMF vector in polar coordinates is denoted by $|V_{ref}|$ and the angle of the BEMF vector in polar coordinates is denoted by $\theta$. Coordinate transformation module 218 may transform the voltages $V_\alpha$ and $V_\beta$ from Cartesian coordinates to polar coordinates using the following transformation equations:

$$|V_{ref}| = \sqrt{V_\alpha^2 + V_\beta^2} \quad (10)$$

$$\theta = \arctan\left(\frac{V_\beta}{V_\alpha}\right) \quad (11)$$

Coordinate transformation module 218 outputs the rotating BEMF space vector.

Rotor calculation module 220 determines the rotor angular velocity $\omega_r$ (hereafter "angular velocity") and rotor position $\phi$ based on the rotating BEMF space vector. Rotor calculation module 220 includes a rotor position calculation module 222 and rotor velocity calculation module 224.

Rotor velocity calculation module 224 determines the rotor velocity $\omega_r$ based on the rotating BEMF space vector. Rotor velocity $\omega_r$ may be determined by calculating the time derivate of BEMF voltage angle $\theta$, the time derivative of rotor position $\phi$, or if rotor flux $\Psi_r$ is known, by calculating the magnitude $|V_{ref}|$ of BEMF vector divided by the magnitude of the rotor flux $|\Psi_r|$. The rotor velocity $\omega_r$ may be calculated using any of the following equations:

$$\omega_r = \frac{d\theta}{dt} \quad (12)$$

$$\omega_r = \frac{d\varphi}{dt} \quad (13)$$

$$|\omega_r| = \frac{|V_{ref}|}{|\Psi_r|} \quad (14)$$

Rotor position calculation module 222 determines the rotor position $\phi$ based on the rotating BEMF space vector. If rotor velocity $\omega_r$ is non-zero, the rotor position $\phi$ is offset (either leads or lags) from the BEMF voltage angle $\theta$ by $$\frac{\pi}{2}$$

radians. The rotational direction of the rotor determines whether the rotor position leads or lags BEMF voltage angle $\theta$. The rotor position $\phi$ may be calculated as:

$$\varphi = \begin{cases} \theta - \dfrac{\pi}{2} & (\omega_r > 0) \\ \text{Unknown} & (\omega_r = 0) \\ \theta + \dfrac{\pi}{2} & (\omega_r < 0) \end{cases} \quad (15)$$

Rotor calculations module 220 determines rotor velocity $\omega_r$ and rotor position $\phi$ and outputs values representing rotor velocity $\omega_r$ and rotor position $\phi$.

Controller 200 controls pulse modulator 230 to control multi-phase motor 108. Pulse modulator 230 modulates the duty cycle of switches $S_1$-$S_6$ of inverter 106 based on rotor velocity $\omega_r$ and rotor position $\phi$. For example, if controller 200 determines that the rotor is spinning in the forward (or correct) direction and the rotor speed satisfies a threshold speed for closed-loop control (e.g, the rotor speed is greater than a threshold speed), pulse modulator 230 modulates the duty cycle of switches $S_1$-$S_6$ in order to control the rotor according to closed-loop control. If controller 200 determines that the rotor is spinning in the reverse (or wrong) direction and the rotor speed satisfies a threshold speed for closed-loop control, pulse modulator 230 modulates the duty cycle of switches $S_1$-$S_6$ in order to control the rotor according to closed-loop control, slow the rotor to a stop, and restart the rotor in the forward direction according to normal startup procedures. If controller 200 determines that the rotor speed does not satisfy a threshold speed for closed-loop control (regardless of rotor direction), pulse modulator 230 modulates the duty cycle of switches $S_1$-$S_6$ in order to slow the rotor to a stop and restart the rotor in the forward direction according to normal startup procedures.

Controller 200 may use the rotating BEMF space vector, rotor velocity $\omega_r$, and rotor position $\phi$ for other applications. In some examples, controller 200 may determine the BEMF voltage constant. For example, controller 200 may determine the magnitude $|Vref|$ of the BEMF vector, the rotor velocity $\omega_r$, and then determine the BEMF voltage constant using the formula:

$$|\Psi_r| = \frac{|V_{ref}|}{|\omega_r|} \quad (16)$$

In some example, controller 200 may estimate the rotor position $\phi$ to calibrate the position offset of rotor sensors (e.g., rotary encoders, resolvers, or Hall sensors). Controller 200 may compare the estimated rotor position to the rotor position from one or more rotor sensors to obtain the offset between the zero-degree position of the motor and the zero-degree position of the rotor sensor(s).

Figure 6:
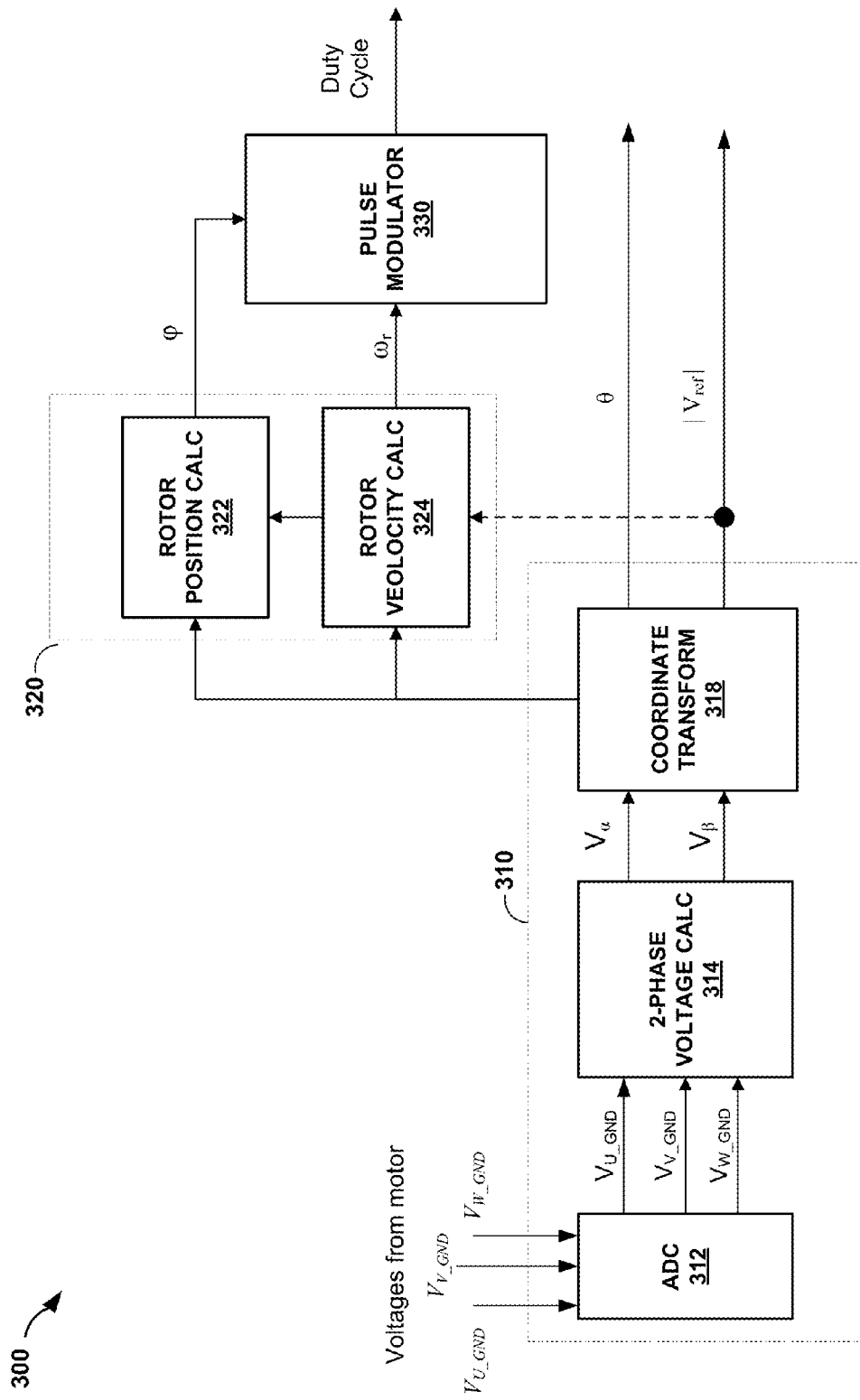
FIG. 6 is a block diagram illustrating an example controller, in accordance with one or more aspects of this disclosure.

FIG. 6 is a block diagram illustrating an example controller 300, in accordance with one or more aspects of this disclosure. In some examples, controller 300 includes voltage calculation module 310, rotor calculation module 320, and pulse modulator 330. Controller 300 controls inverter 106 via modules 310, 320, and 330, which allows controller 300 to control multi-phase motor 108. For ease of illustration only, controller 300 is described as controlling a three-phase motor 108. However, controller 300 may control multi-phase motors with different numbers of phases.

In some examples, voltage calculation module 310 includes a plurality of ADCs 312, and a plurality of sub-modules including 2-phase voltage calculation module 314, and coordinate transformation module 318.

Voltage calculation module 310 includes a plurality of inputs and outputs that are substantially similar to the inputs and outputs described with reference to voltage calculation module 210 of FIG. 5. For example, voltage calculation module 310 may receive voltages from all three phases ($V_{U\_GND}$, $V_{V\_GND}$ and $V_{W\_GND}$), or a subset of voltages from the three phases. In some examples, voltage calculation module 310 outputs a BEMF space vector, including magnitude $|Vref|$ and angle $\theta$. Since the BEMF space vector may be the same as the initial stator voltage space vector, controller 104 may set the closed-loop initial control conditions of the motor and gain control of a free-running motor.

Voltage calculation module 310 determines the motor phase voltages for each phase of multi-phase motor 108 in a manner substantially similar to voltage calculation module 210 of FIG. 5. Voltage calculation module 310 may monitor all three phase voltages with a respective ADC, or voltage calculation module 310 may monitor a subset of the phase voltages with respective ADCs and determine a third phase voltage based on the monitored phase voltages. Each ADC 312 measures the respective motor phase voltages and outputs a digital value that represents the amplitude of the voltage for the respective motor phase.

2-phase voltage calculation module 314 receives the values representing voltages $V_{U\_GND}$, $V_{V\_GND}$ and $V_{W\_GND}$ and determines the equivalent 2-phase sinusoidal voltages $V_\alpha$ and $V_\beta$ in stationary α-β Cartesian coordinate system. 2-phase voltage calculation module 314 may determine voltages $V_\alpha$ and $V_\beta$ from the phase voltages with respect to ground ($V_{U\_GND}$, $V_{V\_GND}$ and $V_{W\_GND}$) without determining the motor phase-to-neutral voltages ($V_U$, $V_V$, and $V_W$) and without performing a Clarke transformation. As a result, controller 300 may require less CPU time and may determine the speed and direction of a free-running motor faster than other controllers. Voltages $V_\alpha$ and $V_\beta$ may be calculated as follows:

$$V_\alpha = K_3 \cdot (2V_{u\_GND} - V_{v\_GND} - V_{w\_GND}) \quad (17)$$

$$V_\beta = K_3 \cdot \sqrt{3} \cdot (V_{vGND} - V_{wGND}) \quad (18)$$

where $K_3 = 1/2$. For simplicity, the scaling factor $K_3$ can be combined with other scaling factors such that $K_3$ can be set equal to one ($K_3 = 1$) and ignored. 2-phase voltage calculation module 314 outputs values representing voltages $V_\alpha$ and $V_\beta$.

Coordinate transformation module 318 receives the values representing the voltages $V_\alpha$ and $V_\beta$ and determines a rotating BEMF space vector, including magnitude $|V_{ref}|$ and angle $\theta$, in a manner substantially similar to coordinate transformation module 218. Coordinate transformation module 318 outputs the rotating BEMF space vector. Rotor calculation module 320 receives the rotating BEMF space vector. Rotor calculation module 320 determines the rotor velocity $\omega_r$ and rotor position $\phi$ based on the rotating BEMF space vector, in a manner substantially similar to rotor calculation module 220.

Controller 300 controls pulse modulator 330 to control multi-phase motor 108. Pulse modulator 330 modulates the duty cycle of switches $S_1$-$S_6$ of inverter 106 based on rotor velocity $\omega_r$ and rotor position $\phi$. Pulse modulator 330 modulates the duty cycle in a manner substantially similar to pulse modulator 230 in FIG. 5.

Controller 300 may use the rotating BEMF space vector, rotor velocity, and rotor position for other applications, such as the examples given for controller 200 in FIG. 5. For example, controller 300 may determine the BEMF voltage constant, or calibrate the position offset of rotor sensors.

Figure 7:
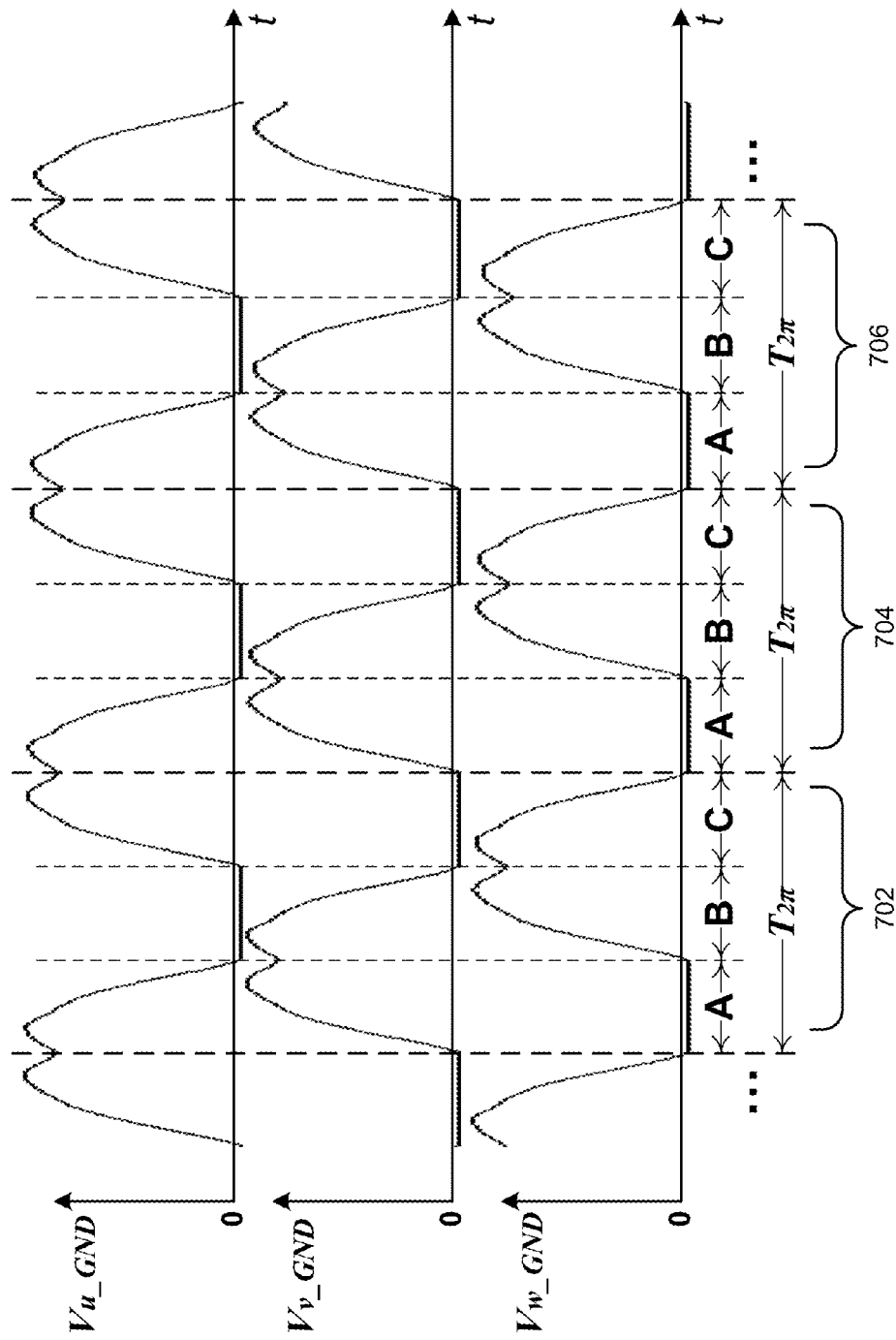
FIG. 7 is a graph illustrating example waveforms for a plurality of input voltages, in accordance with one or more aspects of this disclosure.

FIG. 7 is a graph illustrating example waveforms of a plurality of input voltages, in accordance with one or more aspects of this disclosure. FIG. 7 illustrates typical waveforms of the voltages $V_{U\_GND}$, $V_{V\_GND}$ and $V_{W\_GND}$ of a free-running multi-phase motor 108. Period $T_{2\pi}$ represents an electrical angle of $2\pi$ radians. Voltages $V_{U\_GND}$, $V_{V\_GND}$ and $V_{W\_GND}$ are nearly-periodic and the periods $T_{2\pi}$ as shown will become longer and longer as the free-running motor slows down. In each period $T_{2\pi}$, the voltages $V_{U\_GND}$, $V_{V\_GND}$ and $V_{W\_GND}$ sequentially maintain the lowest voltage for a continuous time of approximately $$\frac{T_{2\pi}}{3}.$$

In other words, each voltage remains at the minimum voltage for approximately one third of the period $T_{2\pi}$. For example, during interval A of period 702, voltages $V_{U\_GND}$ and $V_{V\_GND}$ are above zero volts and $V_{W\_GND}$ remains at the minimum voltage (approximately the negative of the forward voltage (−V$_F$), which is approximately zero volts). Likewise, during interval B of period 702, V$_{V\_GND}$ and V$_{W\_GND}$ are above zero volts and V$_{U\_GND}$ remains at the minimum voltage. Further, during interval C of period 702, V$_{U\_GND}$ and V$_{W\_GND}$ are above zero volts and V$_{V\_GND}$ remains at the minimum voltage. If the ADC values of any two or all of the three voltages V$_{U\_GND}$, V$_{V\_GND}$ and V$_{W\_GND}$ continuously remain below a threshold voltage, controller 104 may determine the motor is at low speed or standstill and can be braked safely. For example, if at least two of the voltages remain below a voltage corresponding to 20 revolutions per minute (RPM) for at least ten seconds, controller 104 may determine that the rotor is spinning slowly and can be braked safely.

Figure 8:
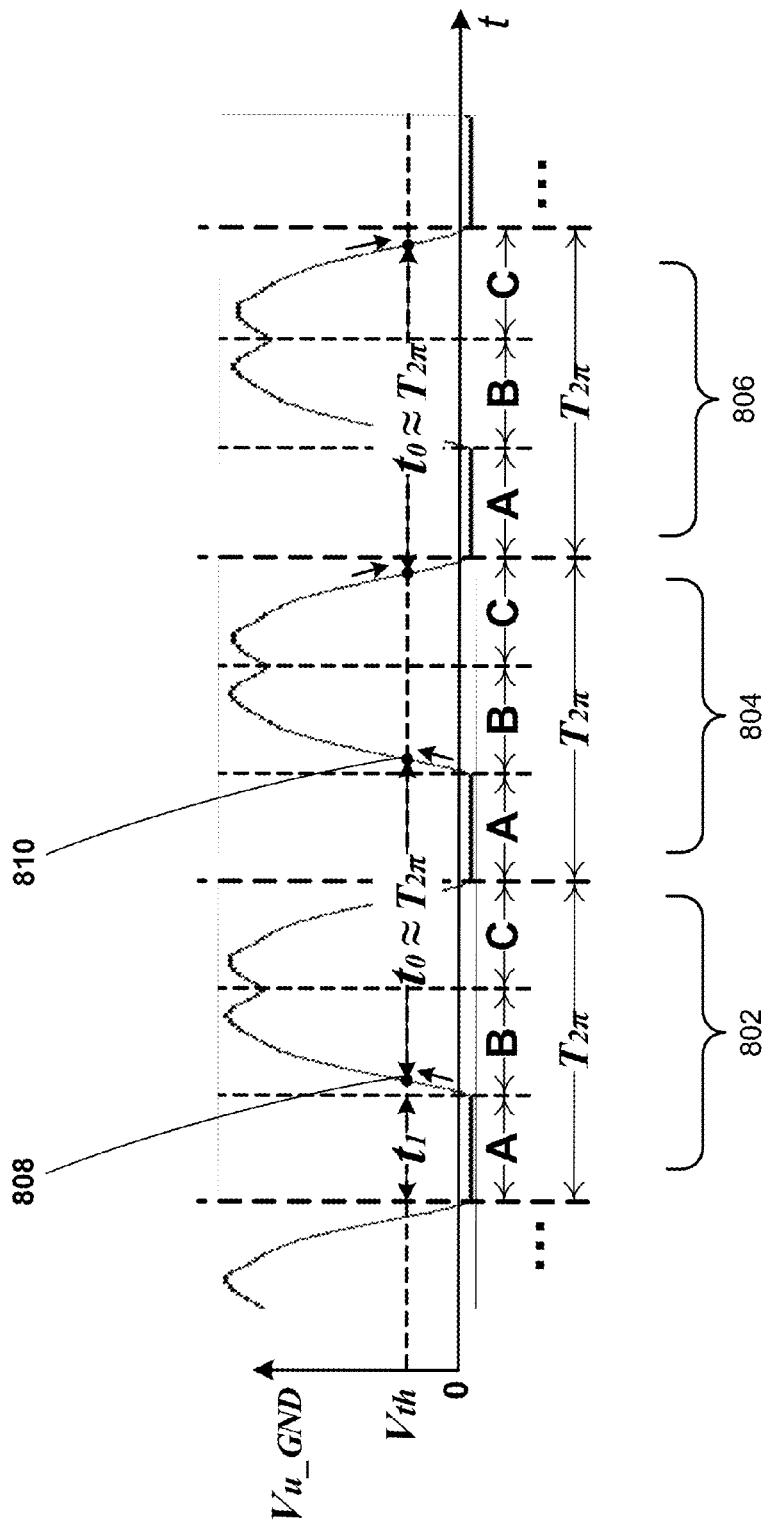
FIG. 8 is a graph illustrating example waveform for an input voltage, in accordance with one or more aspects of this disclosure.

FIG. 8 is a graph illustrating example waveform of an input voltage, in accordance with one or more aspects of this disclosure. In some examples, controller 104 includes only one ADC and measures a single motor phase voltages with the ADC. For example, controller 104 may measure motor phase voltage V$_{U\_GND}$ and determine the time t$_0$ that it takes for V$_{U\_GND}$ to rise (or fall) to voltage threshold V$_{th}$. While FIG. 8 shows the measurement of phase voltage V$_{U\_GND}$, controller 104 may measure any phase voltage of multi-phase motor 108. Controller 104 may determine the rotor speed based on the time t$_0$ that it takes for V$_{U\_GND}$ to rise (or fall) to voltage threshold V$_{th}$, using the formula:

$$\omega_r = \frac{2\pi}{t_0} \quad (19)$$

As illustrated in FIG. 8, controller 104 may start a timer at time 808 when V$_{U\_GND}$ rises to V$_{th}$ and stop the timer at time 810 when V$_{U\_GND}$ again rises to V$_{th}$. Controller 104 may determine the time t$_0$ that elapsed between time 808 and time 810.

In another example, controller 104 may measure motor phase voltage V$_{U\_GND}$ and determine the time t$_1$ that V$_{U\_GND}$ remains at zero volts or approximately zero volts. For example, during each time period 802, 804, 806, V$_{U\_GND}$ remains at zero volts or approximately zero volts for one-third (assuming three-phases) of the electrical period (2π/3) (shown by interval A of each period). Controller 104 may determine the rotor speed based on the time t$_1$ that V$_{U\_GND}$ remains at zero volts or approximately zero volts, using the formula:

$$\omega_r = \frac{2\pi/3}{t_1} \quad (20)$$

Controller 104 may compare the rotor speed to a threshold speed for closed-loop control to determine whether the rotor speed satisfies the threshold speed for closed-loop control. For example, controller 104 may determine that the rotor speed is 20 RPM, compare to a threshold speed for closed-loop control of 30 RPM, and determine that the rotor speed does not satisfy the threshold speed-for closed-loop control, controller 104 may determine that the rotor is spinning slowly and can be braked safely. If controller 104 determines that the rotor speed does not satisfy the threshold speed for closed-loop control, controller 104 may brake the motor so that the rotor stops rotating, and restart the rotor.

Figure 9:
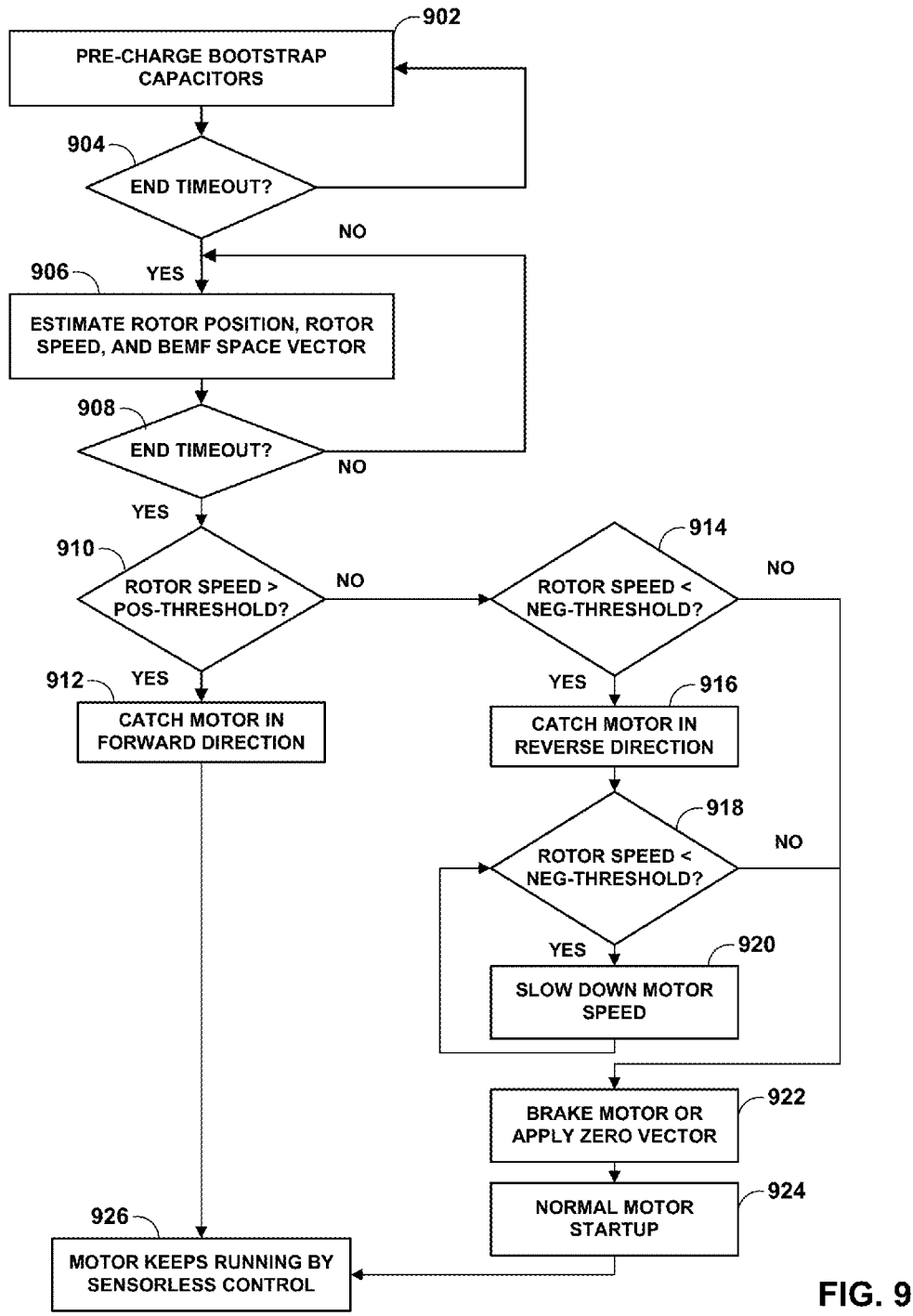
FIG. 9 is a flowchart illustrating an example method for operations of an example controller, in accordance with one or more aspects of this disclosure.

FIG. 9 is a flowchart illustrating an example method for operations of an example controller, in accordance with one or more aspects of this disclosure. The example method is described with reference to controller 104 of FIG. 2 for purposes of illustration only. In some examples, controller 104 may include a first timeout period (e.g., 100 milliseconds). During the first timeout period, controller 104 may be configured to pre-charge the bootstrap capacitors for the gate drivers of inverter 106 (902). Pre-charging the bootstrap capacitors may provide sufficiently high voltage to drive the high side switches (e.g., S$_1$, S$_3$, and S$_5$) of inverter 106. After the bootstrap capacitors are charged, controller 104 may end the first timeout period (904). The first timeout period may be longer or shorter than 100 milliseconds in other examples. For example, the first timeout period may be between 50 milliseconds and 150 milliseconds. In some examples, multi-phase machine 102 may not include bootstrap capacitors, such that controller 104 may skip steps (902) and (904).

Controller 104 may enter a second timeout period (e.g., 0.50 milliseconds) where all of the switches of inverter 106 are off. During the second timeout period, controller 104 may estimate the rotor velocity and rotor position (906). For example, controller 104 may determine a plurality of motor phase voltages from multi-phase motor 108 and determine the rotor velocity and rotor position based on the plurality of motor phase voltages. Controller 104 may estimate the rotor velocity and rotor position several times during the second timeout period. For example, controller 104 may estimate the rotor velocity and rotor position once every 50 microseconds. After determining the rotor velocity and rotor position, controller 104 may end the second timeout period (908). The second timeout period may be longer or shorter than 0.50 milliseconds in other examples. For example, the second timeout period may be between 0.25 milliseconds and 1.50 milliseconds.

Controller 104 may compare the rotor speed to a threshold speed for closed-loop control. In some examples, the threshold speed for closed-loop control may be different depending on the direction of the rotor. For example, the threshold speed for closed-loop control may be a positive speed if the rotor is rotating in the forward direction, and the threshold speed for closed-loop control may be a negative speed if the rotor is rotating in the reverse direction. In some examples, the threshold speed for closed-loop control may be 20 RPM. However, the threshold speed for closed-loop control is not limited to a single speed and depends on the motor and application.

Controller 104 may determine whether the rotor is rotating in the forward direction and whether the rotor speed satisfies a threshold speed for closed-loop control (910). In some examples, a positive speed indicates that the rotor is rotating in the forward (or correct) direction. For example, if controller 104 determines that the rotor speed is positive and that the rotor is rotating in the forward direction, controller 104 may determine that the rotor speed satisfies the threshold speed for closed-loop control if the rotor speed is greater than a positive threshold speed for closed-loop control.

If controller 104 determines that the rotor is rotating in the forward direction and that the rotor speed satisfies a threshold speed for closed-loop control, controller 104 may control multi-phase motor 108 using closed-loop control (912). For example, controller 104 may set the initial control conditions (e.g., inverter output voltage, a plurality of motor phase currents, a plurality of quadrature voltages [V$_d$ and V$_q$], and any other conditions used to control a multi-phase motor) to match the existing conditions. Closed-loop control techniques may include field-oriented control or maximum efficiency tracking In some examples, controller 104 may control multi-phase motor 108 using multiple closed-loop techniques. For example, controller 104 may begin closed-loop control of multi-phase motor 108 using maximum efficiency tracking and transition to field-oriented control.

In some examples, controller 104 may determine whether the rotor is rotating in the reverse direction and whether the rotor speed satisfies a threshold speed for closed-loop control (914). In some examples, a negative speed indicates that the rotor is rotating in the reverse (or wrong) direction. For example, if controller 104 determines that the rotor speed is negative and that the rotor is rotating in the reverse direction, controller 104 may determine that the rotor speed satisfies the threshold speed for closed-loop control if the rotor speed is less than a negative threshold speed for closed-loop control.

If controller 104 determines that the rotor is rotating in the reverse direction and that the rotor speed satisfies a threshold speed for closed-loop control, controller 104 may control multi-phase motor 108 using closed-loop control (916). For example, controller 104 may set the initial control conditions to match the existing conditions. Once controller 104 has gained control of multi-phase motor 108 (with the rotor still rotating in the reverse direction) using closed-loop control, controller 104 may re-determine whether the rotor speed still satisfies a threshold speed for closed-loop control (918). In response to determining that the rotor speed still satisfies a threshold speed for closed-loop control, controller 104 may slow down the speed of multi-phase motor 108 using closed-loop control (920). Controller 104 may continue steps (918) and (920) until controller 104 determines that the rotor speed does not satisfy a threshold speed for closed-loop control.

In some examples, controller 104 may determine that the rotor speed does not satisfy a threshold speed for closed-loop control. For example, controller 104 may determine that the rotor is rotating in the forward direction but that the rotor speed is less than a positive threshold speed for closed-loop control. As a result, controller 104 may determine that the rotor speed does not satisfy a threshold speed for closed-loop control. In another example, controller 104 may determine that the rotor is rotating in the reverse direction and that the rotor speed is greater than a negative threshold. As a result, controller 104 may determine that the rotor speed does not satisfy a threshold speed for closed-loop control. In yet another example, controller 104 may determine that the rotor is not rotating, such that the rotor speed does not satisfy a threshold speed for closed-loop control.

If controller 104 determines that the rotor speed does not satisfy a threshold speed for closed-loop control, controller 104 may brake the rotor by using short motor phases, or applying a voltage with a zero vector or pseudo zero vector (922). Once the rotor is no longer rotating, controller 104 may start the motor using normal motor startup (924) so that the rotor rotates in the forward direction. For example, controller 104 may start multi-phase motor 108 using open-loop control until the rotor speed satisfies a threshold speed for closed-loop control. Once the rotor speed satisfies the threshold speed for closed-loop control, controller 104 may transition to closed-loop control.

Once controller has regained control of multi-phase motor 108 with closed-loop control, controller 104 may keep multi-phase motor 108 running in the forward direction using sensorless field-oriented control (926).

Figure 10:
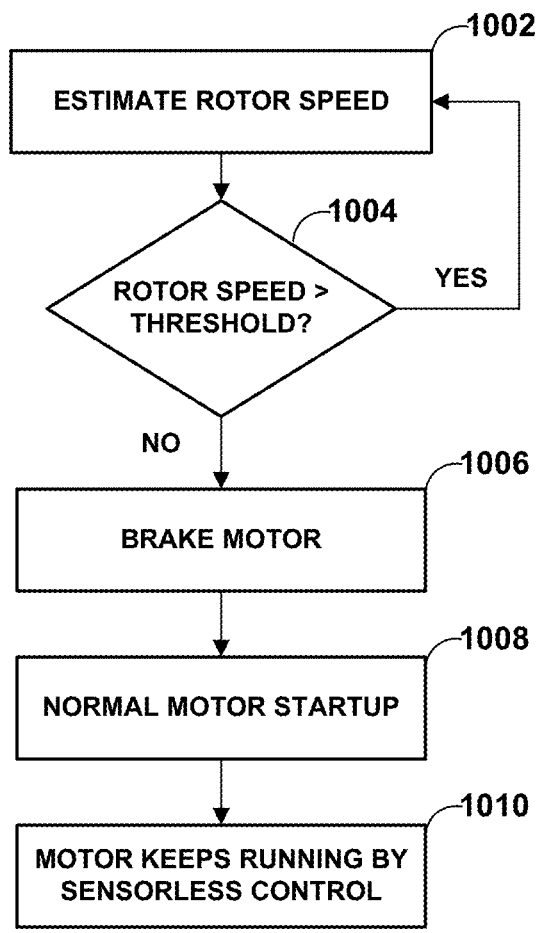
FIG. 10 is a flowchart illustrating an example method for operations of an example controller, in accordance with one or more aspects of this disclosure.

FIG. 10 is a flowchart illustrating an example method for operations of an example controller, in accordance with one or more aspects of this disclosure. The example method is described with reference to controller 104 of FIG. 2 for purposes of illustration only. In some examples, controller 104 may estimate the rotor speed (1020). For example, controller 104 may determine the rotor speed based on the time $t_0$ that it takes for $V_{U\_GND}$ to rise (or fall) to voltage threshold $V_{th}$. In another example, controller 104 may determine the rotor speed based on the time $t_1$ that $V_{U\_GND}$ remains at zero volts or approximately zero volts.

In some examples, controller 104 may compare the rotor speed to a threshold speed for closed-loop control to determine whether the rotor speed satisfies the threshold speed for closed-loop control (e.g., is greater than the threshold speed for closed-loop control) (1004). If controller 104 determines that the rotor speed satisfies the threshold speed for closed-loop control, controller 104 may return to step (1002). However, if controller 104 determines that the rotor speed does not satisfy the threshold speed for closed-loop control (e.g., the rotor speed is less than the threshold speed for closed-loop control), controller 104 may brake the motor (1006). Controller 104 may brake the rotor by using short motor phases, or applying a voltage with a zero vector or pseudo zero vector. Once the rotor is no longer rotating, controller 104 may start the motor using normal motor startup (1008) so that the rotor rotates in the forward direction. For example, controller 104 may start multi-phase motor 108 using open-loop control and then transition to closed-loop control.

Once controller has regained control of multi-phase motor 108 with closed-loop control, controller 104 may keep multi-phase motor 108 running in the forward direction using sensorless field-oriented control (1010).

The following examples may illustrate one or more aspects of the disclosure.

Example 1

A controller for controlling a multi-phase motor, wherein the controller is configured to: measure a plurality of phase voltages of the multi-phase motor when the multi-phase motor is in an uncontrolled state; determine, based on the plurality of measured phase voltages, a position of a rotor of the multi-phase motor; determine, based on the plurality of measured phase voltages, a velocity of the rotor, wherein the velocity of the rotor includes a speed of the rotor and a direction of the rotor; and responsive to determining that the direction of the rotor is a forward direction and the speed of the rotor satisfies a closed-loop threshold speed: set, based on the position of the rotor and the velocity of the rotor, at least one initial control condition of the rotor; and control, using closed-loop control and based on the at least one initial control condition, the rotor.

Example 2

The controller of example 1, wherein the controller is further configured to: responsive to determining that the direction of the rotor is a reverse direction and that the speed of the rotor satisfies a second closed-loop threshold speed: set, based on the position of the rotor and the velocity of the rotor, the at least one initial control condition of the rotor; and slow, using closed-loop control and based on the at least one initial control condition, the rotor until the speed of the rotor does not satisfy the second closed-loop threshold speed.

Example 3

The controller of any combination of examples 1-2, wherein the controller is further configured to: responsive to determining that the speed of the rotor does not satisfy the closed-loop threshold speed: brake the rotor until the rotor has stopped rotating; re-start the rotor in the forward direction; control, using open-loop control and while the speed of the rotor does not satisfy the closed-loop threshold speed, the rotor; and control, using closed-loop control and while the speed of the rotor satisfies the closed-loop threshold speed, the rotor.

Example 4

The controller of any combination of examples 1-3, wherein the controller is further configured to apply a voltage with a zero vector in order to brake the rotor until the rotor has stopped rotating.

Example 5

The controller of any combination of examples 1-4, wherein the controller is configured to measure a plurality of phase voltages of the multi-phase motor by measuring each phase voltage of the multi-phase motor with a respective ADC.

Example 6

The controller of any combination of examples 1-5, wherein the controller is configured to measure a plurality of phase voltages of the multi-phase motor by measuring a subset of phase voltages of the multi-phase motor, wherein the controller is further configured to: measure each of the subset of phase voltages of the multi-phase motor with a respective ADC; and determine, based on the subset of phase voltages, at least one additional phase voltage of the multi-phase motor without measuring the at least one additional phase voltage.

Example 7

The controller of any combination of examples 1-6, wherein the controller is further configured to: determine, based on the measured plurality of voltages, 2-phase sinusoidal voltages $V_\alpha$ and $V_\beta$; determine, based the 2-phase sinusoidal voltages $V_\alpha$ and $V_\beta$, a rotating BEMF space vector, wherein determining the position of the rotor is further based on the rotating BEMF vector, wherein determining the velocity of the rotor is further based on the rotating BEMF vector.

Example 8

The controller of any combination of examples 1-7, wherein setting the at least one initial control condition of the rotor comprises one or more of: setting an initial inverter output voltage, setting a plurality of initial motor phase currents, or setting a plurality of initial quadrature voltages.

Example 9

A method for controlling a multi-phase motor, the method comprising, measuring a plurality of phase voltages of a multi-phase motor when the multi-phase motor is in an uncontrolled state; determining, based on the plurality of measured phase voltages, a position of a rotor of the multi-phase motor; determining, based on the plurality of measured phase voltages, a velocity of the rotor, wherein the velocity of the rotor includes a speed of the rotor and a direction of the rotor; and responsive to determining that the direction of the rotor is a forward direction and the speed of the rotor satisfies a closed-loop threshold speed: setting, based on the position of the rotor and the velocity of the rotor, at least one initial control condition of the rotor; and controlling, using closed-loop control and based on the at least one initial control condition, the rotor.

Example 10

The method of example 9, further comprising: responsive to determining that the direction of the rotor is a reverse direction and that the speed of the rotor satisfies a second closed-loop threshold speed: setting, based on the position of the rotor and the velocity of the rotor, the at least one initial control condition of the rotor; and slowing, using closed-loop control and based on the at least one initial control condition, the rotor until the speed of the rotor does not satisfy the second closed-loop threshold speed.

Example 11

The method of any combination of examples 9-10, further comprising: responsive to determining that the speed of the rotor does not satisfy the closed-loop threshold speed: braking the rotor until the rotor has stopped rotating; re-starting the rotor in the forward direction; controlling, using open-loop control and while the speed of the rotor does not satisfy the closed-loop threshold speed, the rotor; and controlling, using closed-loop control and while the speed of the rotor satisfies the closed-loop threshold speed, the rotor.

Example 12

The method of any combination of examples 9-11, wherein braking the rotor until it has stopped rotating includes applying a voltage with a zero vector.

Example 13

The method of any combination of examples 9-12, wherein measuring a plurality of phase voltages of the multi-phase motor includes measuring each phase voltage of the multi-phase motor with a respective ADC.

Example 14

The method of any combination of examples 9-13, wherein measuring a plurality of phase voltages of the multi-phase motor includes measuring a subset of phase voltages of the multi-phase motor, the method further comprising: measuring each of the subset of phase voltages of the multi-phase motor with a respective ADC; and determining, based on the subset of phase voltages, at least one additional phase voltage of the multi-phase motor without measuring the at least one additional phase voltage.

Example 15

The method of any combination of examples 9-14, further comprising: determining, based on the measured plurality of voltages, 2-phase sinusoidal voltages $V_\alpha$ and $V_\beta$; determining, based the 2-phase sinusoidal voltages $V_\alpha$ and $V_\beta$, a rotating BEMF space vector, wherein determining the position of the rotor is further based on the rotating BEMF vector, wherein determining the velocity of the rotor is further based on the rotating BEMF vector.

Example 16

The method of any combination of examples 9-15, wherein setting the at least one initial control condition of the rotor comprises one or more of: setting an initial inverter output voltage, setting a plurality of initial motor phase currents, or setting a plurality of initial quadrature voltages.

Example 17

A method for controlling a multi-phase motor, the method comprising, a multi-phase motor; and a controller for controlling the multi-phase motor, wherein the controller is configured to: measure a plurality of phase voltages of the multi-phase motor when the multi-phase motor is in an uncontrolled state; determine, based on the plurality of measured phase voltages, a position of a rotor of the multi-phase motor; determine, based on the plurality of measured phase voltages, a velocity of the rotor, wherein the velocity of the rotor includes a speed of the rotor and a direction of the rotor; and responsive to determining that the direction of the rotor is a forward direction and the speed of the rotor satisfies a closed-loop threshold speed: set, based on the position of the rotor and the velocity of the rotor, at least one initial control condition of the rotor; and control, using closed-loop control and based on the at least one initial control condition, the rotor.

Example 18

The method of example 17, wherein the controller is further configured to: responsive to determining that the direction of the rotor is a reverse direction and that the speed of the rotor satisfies a second closed-loop threshold speed: set, based on the position of the rotor and the velocity of the rotor, the at least one initial control condition of the rotor; and slow, using closed-loop control and based on the at least one initial control condition, the rotor until the speed of the rotor does not satisfy the second closed-loop threshold speed.

Example 19

The method of any combination of examples 17-18, wherein the controller is further configured to: responsive to determining that the speed of the rotor does not satisfy the closed-loop threshold speed: brake the rotor until the rotor has stopped rotating; re-start the rotor in the forward direction; control, using open-loop control and while the speed of the rotor does not satisfy the closed-loop threshold speed, the rotor; and control, using closed-loop control and while the speed of the rotor satisfies the closed-loop threshold speed, the rotor.

Example 20

A controller for controlling a multi-phase motor, wherein the controller is configured to: measure a phase voltage of the multi-phase motor with an ADC when the multi-phase motor is in an uncontrolled state; determine, based on the phase voltage, a speed of a rotor of the multi-phase motor; responsive to determining that the speed of the rotor does not satisfy a closed-loop threshold speed: brake the rotor until the rotor has stopped rotating; re-start the rotor in the forward direction; control, using open-loop control and while the speed of the rotor does not satisfy the closed-loop threshold speed, the rotor; and control, using closed-loop control and while the speed of the rotor satisfies the closed-loop threshold speed, the rotor.

The aforementioned examples are used to show examples or applications that are applicable to the techniques and circuits described herein. In one or more examples, the functions described may be implemented in hardware, software, firmware, or any combination thereof. For example, one or more of the controllers described herein implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A controller for controlling a multi-phase motor, wherein the controller is configured to:
while the multi-phase motor is in an uncontrolled state, measure, by a respective ADC of a plurality of ADCs, at least two phase voltages of a plurality of phase voltages generated by the multi-phase motor;
determine, based on the at least two measured phase voltages, a position of a rotor of the multi-phase motor;
determine, based on the at least two measured phase voltages, a velocity of the rotor, wherein the velocity of the rotor includes a speed of the rotor and a direction of the rotor; and
responsive to determining that the direction of the rotor is a forward direction and the speed of the rotor satisfies a threshold speed:
set, based on the position of the rotor and the velocity of the rotor, at least one initial control condition of the rotor; and
control, using closed-loop control and based on the at least one initial control condition, the rotor.

2. The controller of claim 1, wherein the threshold speed is a positive threshold speed, and wherein the controller is further configured to:
responsive to determining that the direction of the rotor is a reverse direction and that the speed of the rotor satisfies a negative threshold speed:
set, based on the position of the rotor and the velocity of the rotor, the at least one initial control condition of the rotor; and
slow, using closed-loop control and based on the at least one initial control condition, the rotor until the speed of the rotor does not satisfy the negative threshold speed.

3. The controller of claim 1, wherein the controller is further configured to:
responsive to determining that the speed of the rotor does not satisfy the threshold speed:
brake the rotor until the rotor has stopped rotating; and
re-start the rotor in the forward direction;
responsive to restarting the rotor in the forward direction, determine whether the rotor speed satisfies the threshold speed;
responsive to determining that the rotor speed does not satisfy the threshold rotor speed, control the rotor using open-loop control; and
responsive to determining that the rotor speed satisfies the threshold rotor speed, control the rotor using closed-loop control.

4. The controller of claim 3, wherein the controller is further configured to brake the rotor by at least being configured to apply a voltage with a zero vector.

5. The controller of claim 1, wherein the controller is configured to measure at least two of the plurality of phase voltages generated by the multi-phase motor by at least being configured to measure each phase voltage generated by the multi-phase motor with a respective ADC of the plurality of ADCs.

6. The controller of claim 1, wherein the controller is configured to measure at least two of the plurality of phase voltages generated by the multi-phase motor by at least being configured to measure a subset of phase voltages generated by the multi-phase motor with a respective ADC of the plurality of ADCs, wherein the controller is further configured to
determine, based on the subset of phase voltages, at least one additional phase voltage generated by the multi-phase motor without measuring the at least one additional phase voltage.

7. The controller of claim 1, wherein the controller is further configured to:
determine, based on the measured plurality of voltages, 2-phase sinusoidal voltages $V\alpha$ and $V\beta$; and
determine, based the 2-phase sinusoidal voltages $V\alpha$ and $V\beta$, a rotating BEMF space vector,
wherein determining the position of the rotor is further based on the rotating BEMF vector, and wherein determining the velocity of the rotor is further based on the rotating BEMF vector.

8. The controller of claim 1, wherein the controller is configured to set the at least one initial control condition of the rotor by at least being configured to:
set an initial inverter output voltage,
set a plurality of initial motor phase currents, or
set a plurality of initial quadrature voltages.

9. A method for controlling a multi-phase motor, the method comprising:
while the multi-phase motor is in an uncontrolled state, measuring, with a respective ADC of a plurality of ADCs, a plurality of phase voltages generated by the multi-phase motor;
determining, based on the at least two measured phase voltages, a position of a rotor of the multi-phase motor;
determining, based on the at least two measured phase voltages, a velocity of the rotor, wherein the velocity of the rotor includes a speed of the rotor and a direction of the rotor; and
responsive to determining that the direction of the rotor is a forward direction and the speed of the rotor satisfies a threshold speed:
setting, based on the position of the rotor and the velocity of the rotor, at least one initial control condition of the rotor; and
controlling, using closed-loop control and based on the at least one initial control condition, the rotor.

10. The method of claim 9, wherein the threshold speed is a positive threshold speed, the method further comprising:
responsive to determining that the direction of the rotor is a reverse direction and that the speed of the rotor satisfies a negative threshold speed:
setting, based on the position of the rotor and the velocity of the rotor, the at least one initial control condition of the rotor; and
slow, using closed-loop control and based on the at least one initial control condition, the rotor until the speed of the rotor does not satisfy the negative threshold speed.

11. The method of claim 9, further comprising:
responsive to determining that the speed of the rotor does not satisfy the threshold speed:
braking the rotor until the rotor has stopped rotating; and re-starting the rotor in the forward direction;
responsive to restarting the rotor in the forward direction, determining whether the rotor speed satisfies the threshold speed;
responsive to determining that the rotor speed does not satisfy the threshold speed, controlling the rotor using open-loop control; and
responsive to determining that the rotor speed does not satisfy the threshold speed, controlling the rotor using closed-loop control.

12. The method of claim 11, wherein braking the rotor until it has stopped rotating includes applying a voltage with a zero vector.

13. The method of claim 9, wherein measuring at least two of the plurality of phase voltages generated by the multi-phase motor includes measuring, with a respective ADC of the plurality of ADCs, each phase voltage generated by the multi-phase motor.

14. The method of claim 9, wherein measuring at least two of plurality of phase voltages generated by the multi-phase motor includes measuring, with a respective ADC of the plurality of ADCs, a subset of the phase voltages generated by the multi-phase motor, the method further comprising
determining, based on the subset of phase voltages, at least one additional phase voltage generated by the multi-phase motor without measuring the at least one additional phase voltage.

15. The method of claim 9, further comprising:
determining, based on the measured plurality of voltages, 2-phase sinusoidal voltages Vα and Vβ; and
determining, based the 2-phase sinusoidal voltages Vα and Vβ, a rotating BEMF space vector,
wherein determining the position of the rotor is further based on the rotating BEMF vector, and wherein determining the velocity of the rotor is further based on the rotating BEMF vector.

16. The method of claim 9, wherein setting the at least one initial control condition of the rotor comprises one or more of:
setting an initial inverter output voltage,
setting a plurality of initial motor phase currents, or
setting a plurality of initial quadrature voltages.

17. A system comprising:
a multi-phase motor; and
a controller for controlling the multi-phase motor, wherein the controller is configured to:
while the multi-phase motor is in an uncontrolled state, measure, by a respective ADC of a plurality of ADCs, at least two phase voltages of a plurality of phase voltages generated by the multi-phase motor
determine, based on the plurality of measured phase voltages, a position of a rotor of the multi-phase motor;
determine, based on the plurality of measured phase voltages, a velocity of the rotor, wherein the velocity of the rotor includes a speed of the rotor and a direction of the rotor; and
responsive to determining that the direction of the rotor is a forward direction and the speed of the rotor satisfies a threshold speed:
set, based on the position of the rotor and the velocity of the rotor, at least one initial control condition of the rotor; and
control, using closed-loop control and based on the at least one initial control condition, the rotor.

18. The system of claim 17, wherein the threshold speed is a positive threshold speed, and wherein the controller is further configured to:
responsive to determining that the direction of the rotor is a reverse direction and that the speed of the rotor satisfies a negative threshold speed:
set, based on the position of the rotor and the velocity of the rotor, the at least one initial control condition of the rotor; and
slow, using closed-loop control and based on the at least one initial control condition, the rotor until the speed of the rotor does not satisfy the negative threshold speed.

19. The system of claim 17, wherein the controller is further configured to:
responsive to determining that the speed of the rotor does not satisfy the threshold speed:
brake the rotor until the rotor has stopped rotating; and
re-start the rotor in the forward direction;
responsive to restarting the rotor in the forward direction, determine whether the rotor speed satisfies the threshold speed;
responsive to determining that the rotor speed does not satisfy the threshold rotor speed, control the rotor using open-loop control; and
responsive to determining that the rotor speed satisfies the threshold rotor speed, control the rotor using closed-loop control.

20. A controller for controlling a multi-phase motor, wherein the controller is configured to:
while the multi-phase motor is in an uncontrolled state, measure, with an ADC, a phase voltage generated by the multi-phase motor;
determine, based on the phase voltage, a speed of a rotor of the multi-phase motor;
responsive to determining that the speed of the rotor does not satisfy a threshold speed:
brake the rotor until the rotor has stopped rotating;
re-start the rotor in the forward direction;
responsive to restarting the rotor in the forward direction, determine whether the rotor speed satisfies the threshold speed;
responsive to determining that the rotor speed does not satisfy the threshold rotor speed, control the rotor using open-loop control; and
responsive to determining that the rotor speed satisfies the threshold rotor speed, control the rotor using closed-loop control.

* * * * *